3,360,586
CATALYTIC DEHYDROGENATION OF PARAFFINIC HYDROCARBONS MIXED WITH TRACE $H_2O$

Herman S. Bloch, Skokie, and Fredrick J. Riedl, Arlington Heights, Ill., assignors to Universal Oil Products Company, Des Plaines, Ill., a corporation of Delaware
No Drawing. Filed July 26, 1966, Ser. No. 567,854
10 Claims. (Cl. 260—683.3)

This application encompasses a process for the catalytic dehydrogenation of paraffinic hydrocarbons to produce olefinic hydrocarbons. More specifically, the invention described herein is directed toward a process for the catalytic dehydrogenation of long chain paraffinic hydrocarbons to produce long chain mono-olefinic hydrocarbons of the same carbon number, which process increases the degree to which conversion equilibrium may be approached without incurring detrimental side reactions adversely affecting the efficiency of conversion to the desired mono-olefin. Through the practice of the present invention, paraffinic hydrocarbons containing from about seven to about twenty carbon atoms per molecule are dehydrogenated to the corresponding mono-olefinic hydrocarbons, and an extended period of operation is afforded during which the catalytic composite exhibits acceptable stability. The present invention is particularly advantageous for the dehydrogenation of long chain normal paraffins containing from about ten to about eighteen carbon atoms per molecule, including decane, undecane, dodecane, tridecane, pentadecane, hexadecane, heptadecane, mixtures thereof, etc., in order to produce the corresponding normal mono-olefins.

The uses of long chain mono-olefinic hydrocarbons are numerous, and are applied with success in a wide variety of industries including the petroleum, petrochemical, pharmaceutical, plastics, heavy chemicals, etc. For example, mono-olefins having from 10 to about 18 carbon atoms per molecule are utilized as the intermediate olefin for use in the alkylation of benzene to make sulfonated detergents, or in the alkylation of phenol to prepare oxyethylated non-ionic detergents. Other uses include direct sulfation to form biodegradable alkylsulfates; direct sulfonation with sodium bisulfite to prepare biodegradable sulfonates; hydration to alcohols which are employed to produce plasticizers, or synthetic lube oils; and in the preparation of the heavy metal sulfonate salts of di-long chain alkyl benzene, which form excellent lube oil detergents.

For a dehydrogenation process to be commercially feasible, the use of a suitable dehydrogenation catalyst is required. Strictly thermal conversion of paraffins to olefins can be effected provided a sufficiently high temperature is utilized. However, due to high temperature pyrolysis, the main reaction becomes cracking which is undesirable from the standpoint of product quality and yield. Furthermore, thermal conversion is highly non-selective such that significant amount of di- and tri-olefins are produced. At temperatures sufficiently low to avoid these deleterious reactions, little or no dehydrogenation takes place. Utilizing a suitable dehydrogenation catalyst solves this anomaly by permitting a relatively low temperature operation for dehydrogenation while simultaneously limiting detrimental side reactions. Prior art processes are replete with suggestions of numerous catalysts suitable for use in promoting the low temperature dehydrogenation of paraffinic hydrocarbons. These catalysts generally consist of one or more metallic components selected from the metals of Groups VI and VIII of the Periodic Table, and compounds thereof. These are employed either unsupported, generally in powder or small particle form, or supported, or carried by a suitable refractory inorganic oxide material. Thus, the prior art dehydrogenation catalysts generally comprise one or more components selected from the group of chromium, tungsten, molybdenum, iron, cobalt, nickel, platinum, iridium, ruthenium, rhodium, osmium, and various compounds thereof. These components are generally composited with a carrier material comprising one or more refractory inorganic oxides from the group of alumina, silica, zirconia, magnesia, thoria, hafnia, titania, boria, etc. Notwithstanding the wide variety of dehydrogenation catalysts, it becomes evident from a perusal of the prior art that any proposed catalyst possesses inherently one or more objectionable characteristics which detract from the suitability and acceptability thereof. Some catalytic composites are too active, to the extent that undesirable side reactions are promoted even at low temperatures. Other catalytic composites are too inactive at low temperatures to promote an acceptable degree of dehydrogenation. Still others are insufficiently stable to be effective for an extended period of time, and as such, do not foster a commercially attractive process. Still other catalysts, possessing the desired degree of activity and stability, and which can be economically utilized for an extended period of time prior to regeneration or replacement, tend to effect dehydrogenation to the extent that the desired mono-olefin is further dehydrogenated to a diene and/or triene, or undergoes dehydrocyclization to form aromatic hydrocarbons. This is particularly the situation with the longer chain n-paraffins—i.e. those having 14 to 20 carbon atoms per molecule.

In conjunction with the various difficulties involved in the selection of a suitable catalytic composite, there is the aspect of reaction (conversion) equilibrium to consider. When operating at, or extremely close to conversion equilibrium regardless of the character of the catalytic composite being used, or the degree to which it successfully promotes dehydrogenation, various side reactions including cracking, skeletal isomerization, aromatization, and runaway dehydrogenation to produce dienes and trienes, are also effected. For instance, in a process for the dehydrogenation of n-dodecane, at close to equilibrium conditions, a significant quantity of the dodecane is converted to di-olefins and aromatic hydrocarbons. Such side reactions obviously detrimentally affect the efficiency of conversion to the desired dodecane, and tend to adversely affect the economic considerations involved in the dehydrogenation process.

The principal object of the present invention is to provide a paraffin dehydrogenation process which can function at close to equilibrium conversion without suffering from excessive side reactions leading to decreased efficiency, excessive cracking which results in the over-production of low molecular weight waste gases, or the deposition of carbon onto and within the catalytic composite, thereby shielding the active surfaces and centers thereof from the paraffin charge stock. When the dehydrogenation process of the present invention is conducted, as hereinafter described in greater detail, we have observed that the side reactions occur in a manner such that cracked products as well as trienes are produced only in trace quantities and, if the charge stock is free from naphthenes, the amount of aromatic formation becomes extremely small. Further, there is essentially no skeletal isomerization of n-olefins to branched chain olefins. Diene formation has been found to be more prevalent at the start of an operation when the catalytic composite is fresh, but declines to about 2.0% of the olefin formation when the catalyst has become sufficiently aged. The presence of these minor quantities of dienes in the olefin product is not troublesome with respect to some of the ultimate uses of the mono-olefin. For example, when the mono-olefinic product is alkylated with benzene, the diene tends either to undergo cyclization to alkylindans or alkyltetralins, or to form diphenyl alkanes, which are easily separated from the desired alkylate. Where the mono-olefinic product is intended for direct sulfation to form biodegradable alkylsulfates, the product resulting from the presence of dienes drops into the acid phase, again becoming easily separable.

Another object of the present invention is to provide a dehydrogenation process to produce long chain mono-olefinic hydrocarbons without incurring the simultaneous production of branched-chain olefins. Although spectroscopic methods of analysis have not detected branched olefins in the product of the present process, up to about 5.0% or even 10.0% of mono-branching (based upon the straight-chain mono-olefins) would not be objectionable for use of the product in preparing alkylbenzene sulfonate detergents. In the case, however, of akylsulfate detergents, branching in even small amounts will lead to unstable tertiary sulfates. Based upon the high stability of some of the sulfates which were prepared from the mono-olefinic product of the present invention, the degree of branching must necessarily be exceedingly small.

In a broad embodiment, the present invention relates to a catalytic dehydrogenation process which comprises reacting a paraffinic hydrocarbon in contact with a noble metal catalyst, hydrogen and water in an amount of at least 400 p.p.m., based upon said hydrocarbon.

A more limited embodiment of the present invention affords a process for effecting the dehydrogenation of a paraffinic hydrocarbon containing from about ten to about twenty carbon atoms per molecule, which process comprises reacting said hydrocarbons, hydrogen and from about 400 to about 3000 p.p.m. of water in contact with a platinum-containing catalytic composite and at dehydrogenating conditions including a pressure above about 10.0 p.s.i.g., a temperature in the range of from about 750° F. to about 1100° F. and a liquid hourly space velocity within the range of about 12.0 to about 40.0.

This process is further characterized in that a particularly preferred dehydrogenation catalyst comprises alkalized alumina containing from about 0.05% to about 5.0% by weight of a Group VIII noble metal, and especially platinum. Although beneficial results are obtained at temperatures of 750° F. to about 1100° F., it is preferred to operate within an intermediate range of from about 800° F. to about 930° F. The dehydrogenation reaction zone will be maintained under an imposed hydrogen pressure above about 10.0 p.s.i.g., with an upper limit of about 100.0 p.s.i.g. In most situations, the reaction zone pressure will be at least 15.0 p.s.i.g., not, however, substantially above about 40.0 p.s.i.g. The pressure will be maintained by compressive hydrogen recycle in an amount such that the mol ratio of hydrogen to hydrocarbon charge is less than about 15:1, and preferably less than about 10:1, the hydrocarbon charge rate being sufficient to result in a liquid hourly space velocity (defined as volumes of hydrocarbon charge per hour per volume of catalyst disposed within the reaction zone) of from 12.0 to about 40.0.

An essential feature of the present invention resides in the use of water as an additive to the normal paraffin charge stock, and in an amount of at least 400 p.p.m., based upon the quantity of hydrocarbon charge. Quantities of water exceeding 3000 p.p.m. do not appear to further enhance the process, and are not, therefore, generally employed. The precise quantity of water in a given situation is dependent primarily upon the particular paraffin charge stock and the operating conditions. Dilution of the charge stock in this manner not only improves the degree to which equilibrium can be approached without substantial loss of conversion activity, but also imparts an unusual degree of stability to the catalytic composite. These advantages of water addition appear to be further enhanced through the simultaneous addition of very minor quantities of sulfur within the range of 50 p.p.m. to about 150 p.p.m. The sulfur can be added by way of a compound thereof, such as tertiary butyl mercaptan being added in a controlled rate to the charge stock. In any event, the sulfur concentrations stated are calculated as elemental sulfur.

As hereinbefore set forth, the preferred catalytic composite comprises alkalized alumina and a Group VIII metallic component. Another component of the catalytic composite is selected from the metals of Group V-A of the Periodic Table, and compounds thereof. By way of explanation, the term "Group V-A," as used in the present specification and the appended claims, alludes to the Periodic Chart of the Elements, Fisher Scientific Company, 1953. Also, it is recognized that the elements of this group are often referred to as "non-metallic" due to their peculiar physical and chemical characteristics. However, for the sake of convenience and consistency, they are herein referred to as "metals." Thus, the catalytic composite preferred for utilization in the dehydrogenation process herein described, comprises a metallic component from the group of arsenic, antimony, bismuth and compounds thereof. Of these, arsenic and antimony are preferred, with arsenic being particularly preferred due to its ability to remain with the catalytic composite during processing and the general non-variation in its effectiveness. These catalytic attenuators are employed in amounts which are based upon the concentration of the Group VIII metallic component and will be present in an atomic ratio (to the Group VIII metal) within the range of from 0.1 to about 0.8. Intermediate concentrations may be suitably employed such that the atomic ratio in the final catalytic composite is about 0.2 to about 0.5 as a preferred range. It is understood that regardless of the precise form in which the various components exist with respect to each other, the concentraitons stated herein are calculated as if the components exist within the composite as the elemental metals.

The particularly preferred dehydrogenation catalyst makes use of a non-acidic, and especially halogen-free, refractory inorganic oxide carrier material. The term "non-acidic" is intended to preclude the use of halogen components and those inorganic oxides which inherently possess the acidic function characteristic of material which actively promotes cracking reactions. The carrier material is combined with a Group VIII noble metal component, an alkali metal component and a catalytic attenuator previously described. Depending upon the particular circumstances involved, the catalyst may contain an alkaline earth metal component, including calcium, magnesium and/or strontium, although the alkali metals, cesium, rubidium, potassium, sodium and especially lithium, are preferred. The Group VIII noble metal, palladium, iridium, ruthenium, rhodium, osmium, and especially platinum, may exist within the composite as the element, as a chemical compound or in physical association with the other catalytic components. In any event, the Group VIII metal will be present in an amount of from about 0.5% to about 5.0%, calculated as if existing as the elemental metal. The alkali metals will be utilized in an amount not generally exceeding 5.0% by weight; in order to achieve a proper balance between inhibiting the occurrence of side reactions and imparting the desired degree of stability, the alkali metals will usually be used in significantly lower concentrations. Therefore, they will generally be present in a concentration within the range of from about 0.01% to about 1.5% by weight, calculated as the element.

The above-described catalytic composite may be prepared in any suitable manner, and it is understood that the particular method chosen is neither essential to, nor limiting upon the present invention. In general, the initial step is the preparation of the alumina carrier material, and the forming thereof into the desired size and/or shape. A suitable carrier material is one which has an apparent bulk density less than about 0.50 gram/cc., with a lower limit of about 0.15 gram/cc. The surface area characteristics are such that the average pore diameter is about 20 to about 300 angstroms. The pore volume is about 0.10 to about 0.80 milliliter per gram and the surface area about 100 to about 700 square meters per gram. The alkali metal, or alkaline earth metal, is added in the form of an aqueous solution thereof, and thus may comprise a chloride, sulfate, nitrate, acetate, carbonate, etc. Similarly, the platinum component or other Group VIII noble metal, may be composited in any suitable manner, one particularly convenient method involving the use of an impregnating solution of a water-soluble platinum compound such as chloroplatinic acid. The impregnated carrier material is then dried at a temperature of about 100° F. to about 300° F., and thereafter subjected to a calcination treatment at an elevated temperature of about 800° F. to about 1100° F. The catalytic attenuator, selected from the group consisting of arsenic, antimony and bismuth, may be incorporated into the catalytic composite in any suitable manner, such as utilizing an impregnating technique followed by drying and calcination. A convenient impregnating solution is an ammoniacal solution of the oxides thereof, such as $As_2O_5$.

Although it can be shown that supported platinum-containing catalysts are very active in promoting the dehydrogenation of hydrocarbons, they possess inherently additional, objectionable properties which stem from the overall activity and ability which platinum has for promoting other types of reactions. The utilization of the alkalized alumina effectively inhibits a substantial amount of the cracking and skeletal isomerization reactions by neutralizing a portion of the inherent acid function possessed by platinum, as well as that of the carrier material; however, sufficient cracking activity remains such that higher temperature operation to increase the conversion of the long chain paraffinic hydrocarbons is precluded. Furthermore, there still is present the inherent capabilities of platinum to promote isomerization and cyclization reactions. This is still further compounded by the fact that where higher temperature can be afforded for the purpose of increasing conversion without substantially increasing cracking, there exists an accompanying increase in the tendency to promote these other side reactions. Thus, at a given temperature and conversion level, the addition of lithium for the purpose of decreasing cracking activity to permit increasing temperature to increase dehydrogenation, falls short of economic acceptability due to the increased tendency toward aromatization, whereby the efficiency, or selectivity, of conversion to the desired mono-olefins suffers.

The principal function of the catalytic attenuator, arsenic, antimony, and/or bismuth, is actually two-fold, although the intended effect is the same. That is, the catalyst attenuator is specifically intended to poison the platinum to the extent that its residual cracking activity is virtually completely curtailed, and the tendency to promote the other side reactions, particularly cyclization, is substantially eliminated. The uniqueness of these attenuators resides in the fact that the dehydrogenation activity of the platinum component is hardly affected. The doping or poisoning action of the attenuator is highly selective in this regard. Actually, there is no dehydrogenation activity supplied by the attenuator, but rather a doping or poisoning effect directed toward the specific side reactions which the platinum component would otherwise be capable of promoting. Through the increased efficiency of conversion to the monoolefins, and the increased stability of the catalytic composite resulting from the water addition concept of the present invention, the overall beneficial effect resides in the resulting economic considerations involved in the effective catalyst life and the total quantity and quality of desired product.

The following examples are presented for the purpose of illustrating the dehydrogenation process hereinbefore described and to indicate the benefits derived through the utilization thereof. It is not intended to limit the scope of the invention, as defined by the appended claims, to the catalyst, operating conditions, concentrations, charge stock, etc., employed in these examples. Modification of these variables, within the aforementioned limits, may be made by those skilled in the art of petroleum refining operations, in order to achieve optimum economic advantage in a given situation.

In the examples which follows, the catalytic composite was disposed in a stainless-steel tube of ⅞-inch nominal inside diameter. Unless otherwise indicated, the catalytic composite was employed in an amount of about 5.0 cc., above which was placed approximately 11 cc. of alpha-alumina particles. The heat of reaction was supplied by a spiral inner preheater located above the alpha-alumina ceramic particles. Hydrogen was introduced to the reaction zone by way of compressive recycle in admixture with the hydrocarbon charge stock. The non-attenuated catalytic composite was a commercially available alumina carrier which had been impregnated with chloroplatinic acid and lithium nitrate to yield a finished catalyst containing usually 0.75% by weight of platinum and about 0.5% by weight of lithium. When this catalyst was "doped" with an attenuator, for example arsenic, an ammoniacal solution of arsenic oxide ($As_2O_5$), was utilized in the quantity required to give the desired atomic ratio of arsenic to platinum. The incorporation of the arsenic component was accomplished by impregnating the lithiated alumina-platinum composite, followed by drying at a temperature of about 210° F. and calcination in a muffle furnace for approximately 2 hours at a temperature of 932° F. It is understood that the catalytic composite may be prepared in any suitable manner, and that no particular method is either essential to, or limiting upon the present invention.

With respect to the utilization of various additives in admixture with the long chain paraffin charge stock, it was found that the addition of water in amounts as high as 2500 p.p.m., based upon the charge stock, had no deleterious effect upon the conversion or selectivity. However, it was noted that the quantity of aromatic hydrocarbons produced was lessened to a slight degree while the quantity of di-olefinic hydrocarbons was slightly increased. Also, there appeared to an indication that the utilization of water would increase the stability of the catalytic composite, thereby affording an extended period of acceptable operation. With respect to the addition of sulfur, or the inclusion of sulfur as a component of the catalytic composite, there appeared to be little effect upon conversion and/or selectivity, although stability was somewhat improved.

In an operation using an arsenic-attenuated catalyst of alumina, 0.75% by weight of platinum and 0.5% by weight of lithium, the deactivation rate, using n-dodecane as the charge stock, was 1.0% (conversion) per 50 hours. This result was obtained in the absence of both water and sulfur. At identical operating conditions, but with 50 p.p.m. of sulfur added to the n-dodecane charge in the form of tertiary butyl mercaptan, the deactivation rate slowed to 1.0% (conversion) per 110 hours. Adding 100 p.p.m. of sulfur, continuing at the same operating conditions, and with the same catalyst, did not materially affect the rate of deactivation. However, the initial deactivation was such that the percent conversion was consistently 1.0% greater throughout the 100-hour operation.

EXAMPLE I

The preliminary observations and the results obtained using water and sulfur as additives to the normal paraffin charge stock, each in the absence of the other, indicated probable means for enhancing catalyst stability notwithstanding the use of the catalytic attenuators.

In this operation, n-dodecane was dehydrogenated using a catalyst of 0.75% by weight of platinum, 0.5% by weight of lithium and an arsenic/platinum atomic ratio of 0.3, the carrier material consisting solely of alumina. The operating conditions included a liquid hourly space velocity of 32.0, a temperature of 870° F., a pressure of 10.0 p.s.i.g. and a hydrogen to hydrocarbon mol ratio of 8:1. In the absence of water, the conversion of n-dodecane decreased from about 18.0% to about 12.0% within the first 50 hours of operation. When conducted under identical conditions, with the exception that water was added to the charge stock in an amount of 2000 p.p.m., the conversion held fairly steadily between 14.5% and 16.0% for 120 hours.

again, the charge stock was n-dodecane. In order to determine the effect of water on catalyst stability, the entire operation was divided into three principal divisions in which the temperature for the first eight hours (following a two-hour line-out period) was maintained at 850° F., increased to 890° F. for the next eight hours, and lowered to 850° F. for a last two-hour period. Each of these divisions was separated from the previous by a two-hour line-out period. Additionally, the concentration of water was varied from 0 to 3000 p.p.m. (based upon the paraffin feed). The results are presented in the following Table I:

TABLE I.—EFFECT OF WATER ADDITION

| | | Period | | | | | |
|---|---|---|---|---|---|---|---|
| | | A | | B | | C | |
| Time in Hours | | 2–8 | | 10–16 | | 18–20 | |
| Temperature, °F | | 850 | | 890 | | 850 | |
| P.p.m. | | Percent | | Percent | | Percent | |
| Water | Sulfur | Conversion | Selectivity | Conversion | Selectivity | Conversion | Selectivity |
| 0 | 0 | 17.6 | 86.5 | 21.1 | 82.2 | 13.3 | 91.7 |
| 400 | 100 | 12.7 | 92.9 | 22.2 | 91.3 | 13.3 | 96.2 |
| 1,500 | 100 | 14.2 | 93.0 | 20.4 | 88.4 | 13.7 | 94.9 |
| 3,000 | 100 | 14.7 | 93.1 | 20.0 | 87.0 | 12.6 | 94.5 |

EXAMPLE II

This particular operation was effected utilizing n-dodecane as the charge stock with 2000 p.p.m. of water added thereto, the operating conditions being a liquid hourly space velocity of 32.0, a catalyst bed temperature of 825° F. for the first 40 hours and 850° F. for the last 206 hours (the total length of the operation being 246 hours), a reaction zone pressure of 15.0 p.s.i.g. and a mol ratio of hydrogen to hydrocarbon of 8:1. At the end of the first 40 hours, the conversion was 11.9% and the selectivity 93.2%. For the period of time representing 240 to 246 hours, the conversion was 11.4% and the selectivity was 93.0%. Between these periods, the lowest conversion was 11.2%, accompanied by a selectivity of 95.5%, and the highest conversion was 12.0%, accompanied by a selectivity of 95.0%.

EXAMPLE III

All the indicated operations herein were conducted at conditions including a pressure of 10.0 p.s.i.g., an 8:1 hydrogen to hydrocarbon mol ratio, and a liquid hourly space velocity of 16.0 The catalytic composite was alumina containing 0.5% by weight of lithium, 0.75% by weight of platinum and arsenic in an atomic ratio to platinum of 0.47. Sulfur addition in all but the first instance was 100 p.p.m., the water addition rate being varied as indicated;

Upon referring to the data presented in the foregoing Table I, it will be noted that, although the addition of water appears to decrease the initial activity, there is an accompanying consistent increase in selectivity of conversion to the desired mono-olefin. Of greater significance is the outstanding results obtained during period "C" after the operation has been conducted at the higher temperature of 890° F. for eight hours (discounting the two-hour line-out portion following the initial operation at 850° F.) in which the temperature had been lowered to a level of 850° F. The activity is about the same without and with water addition, but the selectivity has been improved. Furthermore, it is evident that the catalyst stability has been significantly improved. With respect to results obtained on the dehydrogenation of n-undecane, n-dodecane indicates greater activity and somewhat less selectivity, but the differences are smaller in the presence of the additives than in their absence.

EXAMPLE IV

This example is presented to indicate the comparison of results obtained with water and sulfur addition to the homologs, undecane and n-dodecane. The catalyst and operating conditions were identical to those of the preceding Example III. The results are given in the following Table II:

TABLE II.—COMPARISON OF DODECANE AND UNDECANE

| | | Period | | | | | |
|---|---|---|---|---|---|---|---|
| | | A | | B | | C | |
| Time in Hours | | 2–8 | | 10–16 | | 18–20 | |
| Temperature, °F | | 850 | | 890 | | 850 | |
| P.p.m. | | Percent | | Percent | | Percent | |
| Water | Sulfur | Conversion | Selectivity | Conversion | Selectivity | Conversion | Selectivity |
| 0 | [1] 0 | 17.6 | 87 | 21.1 | 83 | 13.3 | 92 |
| 400 | [1] 100 | 12.7 | 93 | 22.2 | 91 | 13.3 | 96 |
| 0 | [2] 0 | 11.9 | 95 | 18.3 | 90 | 11.7 | 97 |
| 400 | [2] 100 | 12.6 | 95 | 18.6 | 87 | 12.2 | 96 |

[1] n-Dodecane charge stock.  [2] n-Undecane charge stock.

It appears that, as the molecular weight of the long chain paraffin increases, reactivity increases and the selectivity of conversion to the mono-olefin is somewhat decreased. In each instance, however, the results obtained in the presence of 400 p.p.m. of water are better in both selectivity and stability than those obtained in the absence of water.

EXAMPLE V

The higher molecular weight normal paraffins were dehydrogenated in the presence of 2000 p.p.m. of water, utilizing a catalytic composite of alumina, 0.75% by weight of platinum, an arsenic to platinum atomic ratio of 0.3 and 0.50% by weight of lithium. Operating conditions included a pressure of 20.0 p.s.i.g., a space velocity of 32.0 and a hydrogen/hydrocarbon mol ratio of 8.0.

At a temperature of 440° C., n-tetradecane indicated a selectivity to the desired mono-olefin of 93% at a conversion level of 9.5%; at 454° C., the conversion increased to 11.2% while the selectivity remained at 93.0%. Using n-pentadecane, the conversion was 9.5% at 440° C., accompanied by a selectivity of 95.0%; at a temperature of 454° C., the conversion of n-pentadecane was 13.0% and the selectivity was 90.0%.

At a temperature of about 445° C., the conversion of n-hexadecane was 11.4 and the selectivity to the mono-olefin was 97.0%. Somewhat surprising results were obtained using n-heptadecane and n-octadecane. In the case of the former, at a temperature of 440° C., the conversion was 11.0%, accompanied by a selectivity of 94.0%, whereas, in the case of the latter, at 440° C., the conversion was 13.0% and the selectivity, based upon only trace quantities of aromatic hydrocarbons and di-olefins, approached 100.0%.

The foregoing specification, and especially the examples, clearly indicate the unique results obtained through the utilization of the present invention in a dehydrogenation process using long chain paraffins as the hydrocarbon charge stock.

We claim as our invention:

1. A catalytic dehydrogenation process which comprises reacting a straight-chain paraffinic hydrocarbon of from about 7 to about 20 carbon atoms per molecule in contact with a Group VIII noble metal catalyst supported on a nonacidic refractory inorganic oxide carrier, hydrogen, and water in an amount of at least about 400 p.p.m., based upon said hydrocarbon, said hydrogen and water being added with the hydrocarbon feed.

2. The process of claim 1 further characterized in that said supported catalyst contains a catalytic attenuator selected from the group consisting of arsenic, antimony and bismuth.

3. The process of claim 1 further characterized in that said hydrocarbon is reacted at dehydrogenation conditions including a pressure above about 10.0 p.s.i.g., a temperature in the range of from 750° F. to about 1100° F. and a liquid hourly space velocity of from about 12.0 to about 40.0.

4. The process of claim 1 further characterized in that said paraffinic hydrocarbon is commingled with water in an amount of from about 400 to 3000 p.p.m.

5. The process of claim 1 further characterized in that said carrier is alkalized alumina.

6. The process of claim 1 further characterized in that said paraffin is n-dodecane.

7. The process of claim 2 further characterized in that said attenuator is arsenic.

8. The process of claim 2 further characterized in that said supported catalyst is arsenided platinum on lithiated alumina.

9. A catalytic dehydrogenation process which comprises reacting a straight-chain paraffinic hydrocarbon of from about 7 to about 20 carbon atoms per molecule in contact with a Group VIII noble metal catalyst supported on alkaylized alumina, hydrogen, from 400 p.p.m. to about 3000 p.p.m. of water and from 50 p.p.m. to 150 p.p.m. of sulfur, calculated as the element.

10. The process of claim 9 further characterized in that said supported catalyst contains a catalytic attenuator selected from the group consisting of arsenic, antimony and bismuth.

References Cited

UNITED STATES PATENTS 3,126,426   3/1964   Turnquest et al. _____ 260—683.3
3,168,587   2/1965   Michaels et al. _____ 260—683.3

PAUL M. COUGHLAN, Jr., *Primary Examiner.*

DELBERT E. GANTZ, *Examiner.*

G. E. SCHMITKONS, *Assistant Examiner.*